United States Patent
Tago et al.

(10) Patent No.: US 7,421,424 B2
(45) Date of Patent: Sep. 2, 2008

(54) DATABASE SEARCH INFORMATION OUTPUT METHOD

(75) Inventors: Shigeru Tago, Tokyo (JP); Junji Yoshii, Tokyo (JP); Tadashi Mizunuma, Tokyo (JP); Katsunori Masaki, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 721 days.

(21) Appl. No.: 10/773,347

(22) Filed: Feb. 9, 2004

(65) Prior Publication Data

US 2004/0193588 A1  Sep. 30, 2004

(30) Foreign Application Priority Data

Mar. 28, 2003  (JP)  ............................. 2003-092632

(51) Int. Cl.
  *G06F 17/30* (2006.01)
(52) U.S. Cl. ................................ 707/3; 707/1; 707/200
(58) Field of Classification Search .................... 707/1, 707/3, 200, 102
See application file for complete search history.

(56) References Cited

U.S. PATENT DOCUMENTS

| | | | |
|---|---|---|---|
| 5,515,488 A | 5/1996 | Hoppe et al. | |
| 5,790,121 A | 8/1998 | Sklar et al. | |
| 5,812,134 A | 9/1998 | Pooser et al. | |
| 6,326,962 B1 | 12/2001 | Szabo | |
| 6,499,026 B1 * | 12/2002 | Rivette et al. | .................. 707/2 |
| 2002/0099685 A1 | 7/2002 | Takano et al. | |
| 2004/0059755 A1 * | 3/2004 | Farrington et al. | .......... 707/200 |
| 2005/0108219 A1 * | 5/2005 | De La Huerga | ................ 707/3 |

(Continued)

FOREIGN PATENT DOCUMENTS

EP   1 182 581 A1   8/2000

(Continued)

OTHER PUBLICATIONS

Mulani et al., "A Graphical Navigator for Viewing Databases", Software-Practice and Experience, vol. 26(4), Apr. 1996, pp. 411-426.

(Continued)

*Primary Examiner*—Charles Rones
*Assistant Examiner*—Rezwanul Mahmood
(74) *Attorney, Agent, or Firm*—Reed Smith LLP; Stanley P. Fisher, Esq.; Juan Carlos A. Marquez, Esq.

(57) ABSTRACT

The invention provides information concerning records that cannot be retrieved on a search path among databases when the retrieval of search keys for other related databases and records is carried out in a plurality of databases in a chain-reactive manner. In the course of retrieving search keys and records in a chain-reactive manner up to a terminal database, information for identifying a group of search keys and a group of records retrieved through a series of retrieval processing is outputted in one line or one column of a table. When the record retrieved from a certain database in the chain-reactive search procedure does not contain a search key to be entered into a subsequent database, information for identifying a record that does not contain the search key and information for identifying a database having the record is outputted.

4 Claims, 4 Drawing Sheets

U.S. PATENT DOCUMENTS

2006/0074991 A1* 4/2006 Lussier et al. ............... 707/200
2006/0251226 A1* 11/2006 Hogan et al. ........... 379/114.15

FOREIGN PATENT DOCUMENTS

| EP | 1 229 456 A2 | 3/2001 | | |
|---|---|---|---|---|
| JP | 10-063680 | 8/1996 | | |
| JP | 2000-222418 | 1/1999 | | |
| JP | 2002-123555 | 10/2000 | | |
| WO | WO 02/05084 A2 | 1/2002 | | |
| WO | WO 02/054326 A2 | 1/2002 | | |
| WO | WO 02/33571 A2 * | 4/2002 | ................ | 707/102 |
| WO | WO 02/33572 A2 | 4/2002 | | |

OTHER PUBLICATIONS

Zisman et al., "Supporting Interoperability of Autonomous Hospital Databases: A Case Study", Advances in Databases and Information Systems, (1997), pp. 1-17.

Zisman et al., "An Approach to Interoperation Between Autonomous Database Systems", The British Computer Society, (1999), pp. 135-148.

European Search Report dated Jun. 30, 2005.

European Search Report dated Aug. 4, 2004.

* cited by examiner

| 201 | 202 | 203 |
|---|---|---|
| G0001 | WITH THE FUNCTION OF RECEIVING A SEARCH KEY AND EXTRACTING RECORDS THAT INCLUDE THE SEARCH KEY... | H0001 |
| | | H0002 |
| | | H0003 |
| G0002 | DESIGNATED ON THE SCREEN BETWEEN THE FIRST DATABASE AND THE TERMINAL DATABASE... | H0004 |
| | | H0005 |
| | | H0006 |

FIG. 4

| A | B | C | D |
|---|---|---|---|
| A0001 | B0001 | | |
| | B0002 | C0002 | D0002 |
| | | | D0003 |
| | | C0003 | |
| | B0003 | C0004 | |
| | | C0005 | D0006 |
| | | | D0007 |
| | | | D0008 |

| 401 | 402 |
|---|---|
| C0004 | IN A DATABASE SYSTEM HAVING THE FUNCTION OF EXTRACTING RECORDS CONTAINING THE SEARCH KEY THAT IS ENTERED INTO THE SYSTEM, A RECORD EXTRACTION IS CARRIED OUT USING A FIRST SEARCH KEY THAT IS ENTERED INTO A FIRST DATABASE AND A SEARCH KEY THAT IS CONTAINED IN EXTRACTED RECORDS AND DIFFERENT FROM THE FIRST SEARCH KEY IS ENTERED AS A SECOND SEARCH KEY INTO A SECOND DATABASE DIFFERENT FROM THE FIRST DATABASE SO THAT A RECORD EXTRACTION IS CARRIED OUT IN THE SECOND DATABASE... |

DATABASE SEARCH INFORMATION OUTPUT METHOD

This application is based on the Japanese Patent Application 2003-092632, filed on Mar. 28, 2003, all the contents of which is incorporated in this application by reference.

BACKGROUND OF THE INVENTION

1. Technical Field

The present invention relates to a database search system, and more particularly to a search method for carrying out the retrieval of record and search key between a plurality of databases in a chain-reactive manner.

2. Background Art

There are cases where various records regarding a particular theme are stored in a plurality of different databases. In a typical example, a plurality of databases in which attributes from different viewpoints regarding a particular gene or protein are stored as records are operated by separate organizations. Users of these databases can utilize such a group of databases mainly in the following two ways.

(1) To input a search key concerning a single theme into a plurality of databases in a parallel manner, and then retrieve records.

(2) To input a search key concerning a single theme into one specific database, and refer to resultant, retrieve records. The records in many cases describe link information to related records in the form of search keys that can be entered into other databases. Thus, a user can acquire the search keys and enter them into the databases to which they can be entered, so that the user can refer to a retrieved record.

When there are a plurality of databases, the form of the search keys that can be entered into the databases, namely record IDs or document Nos., are often different. Accordingly, in mode (1) of use, the user must obtain different kinds of search keys corresponding to a desired theme in advance, thereby complicating the operation. Thus, it is more advantageous to employ mode (2) of use, wherein the entry of a single search key corresponding to a desired theme enables the retrieval of records concerning the same theme in other databases in a chain-reactive manner.

Further, a method is used whereby the process of retrieving extracting a search key and entering it into another database is carried out for three or more databases, instead of two databases on a one-to-one basis, in a chain-reactive manner, and the process is automatically repeated until reaching a terminal database designated in advance by the user. In accordance with this method, a chain-reactive trace of the keys that are information linking to related records enables indirect entry of a search key that cannot be directly entered into the desired terminal database, and therefore records in the terminal database can be retrieved and referred to, so that the efficiency of the search-key input operations can be significantly improved.

The Japanese patent application kokai 2000-222418, laid open 11th August, 2000, which discloses a data base retrieving device, mode (2) of the device is provided with two or more data bases, a retrieving object data base input device for specifying a data base to be retrieved, a priority information input device for setting up priority at the time of retrieving each specified data base to be retrieved, and a retrieving request input device for inputting information indicating a retrieving request. The device is also provided with a data base retrieving device for applying retrieval corresponding to priority to the data base to be retrieved and extracting information having high relationship with the inputted retrieving request, a modedata base restricting device for restricting a data base to be used for retrieval and a data display device for displaying extracted information.

The above described database enables to execute retrieval considering the priority of respective databases in the case of retrieving plural databases and to display and report a list of retrieved results to a user so that the features of retrieved results can easily be understood.

The mode (2) of use, however, has the following problems. Namely, whether or not a key as information linking to related records of other related databases is contained in records of each database depends on the intention of the record producer of each database, and those intentions are largely dependent on the personal viewpoint of the producer. Although it is fundamentally preferable to enable chain-reactive processing until records are retrieved from the terminal database as related records, a suitable record often cannot be retrieved from the terminal database if any one database on the path (hereafter referred to as "intervening database") does not contain a search key. There is no solution for the above problem in the Japanese patent application.

SUMMARY OF THE INVENTION

The present invention has an object to provide a method for using a search result when a suitable record cannot be retrieved from a terminal database.

The present invention therefore provides the following means to solve the problems of the mode (2) of use and to produce a secondary effect. Namely, there is provided a database system wherein a record retrieval is carried out using a first search key that is entered into a first database (hereafter referred to as "key database"), a key that is contained in the retrieved record and different from the first search key is entered as a second search key into a (second) database (hereafter referred to as "intervening database") different from the key database, so that a record retrieval is carried out in the second intervening database. This is followed by the retrieval of search keys and records from one or more intervening databases in a chain-reactive manner. Then, the system provides, upon retrieval of records from a pre-designated terminal database, the retrieved records as search results. In this database system, when one or more records associated with one first search key are retrieved from databases other than the key database and the record retrieved from a certain database in the chain-reactive search process does not contain a search key to be entered into a subsequent database, information for identifying a record that does not contain the search key and a database having the record is outputted.

Further, when a record that does not contain a search key to be entered into a subsequent database is present among the retrieved records in any intervening database other than the key database and the terminal database, information for identifying the record and a database having the record and, at the same time or by a specific operation, the contents of the record is also outputted.

Furthermore, in the course of retrieving search keys and records in a chain-reactive manner until the terminal database is reached, information for identifying a group of search keys and a group of records retrieved through a series of retrieving processing steps is outputted in one line or one column of a table.

The above means can provide the following effects.

(1) The user can recognize that a sufficient number of records cannot be retrieved from the terminal database because records of any intervening database do not contain search keys for subsequent databases in the course of retrieving search keys and records using the entered search key along a specified path in a chain-reactive manner up to the terminal database.

(2) If any intervening database has a record that does not contain a search key for the subsequent database, the user can easily and visually recognize the record.

(3) If any intervening database has a record that does not contain a search key for the subsequent database, the user can assume the reason why the search key is not contained by directly referring to the record.

BRIEF DESCRIPTION OF THE DRAWINGS

FIG. 4 is a view showing an example of a screen which displays search results based on the search path R1 shown in FIG. 3 in the database search system of the embodiment of the invention.

FIG. 5 is a view showing an example of a screen which displays the search key shown in FIG. 4 and record content corresponding thereto.

DETAILED DESCRIPTION OF THE PREFERRED EMBODIMENTS

It is convenient for a user to be able to recognize that a group of records finally obtained from the terminal database is insufficient depending on a path selected from paths among a plurality of databases, since the chain-reactive record retrieval is carried out based on the selected path. When the user can recognize such fact, the user recognizes the fact that search keys that the user expected to be present are not contained in a record of a certain intervening database. On top of this, the user can conversely investigate the reason why the search key is not contained in such record and then acknowledge why it is impossible to carry out the firstly expected record retrieval in a chain-reactive manner. The user can thereby recognize the features of the theme regarding which the user attempts to undertake a search.

Figures 1, 2:
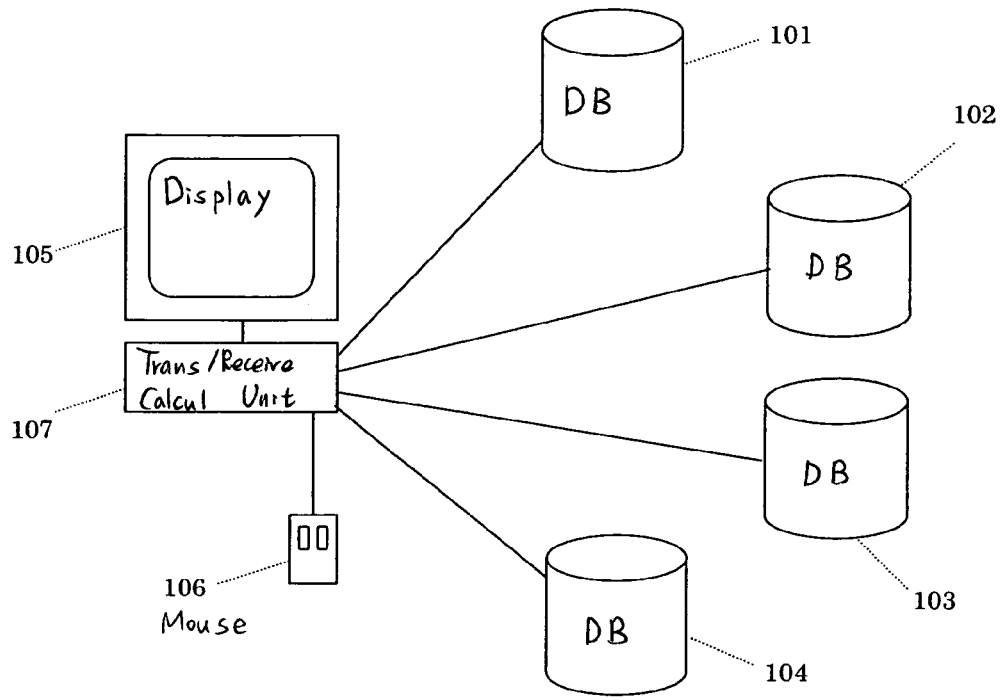
FIG. 1 is a view showing an example of a database search system according to one embodiment of the invention.
FIG. 2 is a view showing an example of the structure of a table of each database.

Hereafter an embodiment of the invention will be described by referring to the drawings. FIG. 1 is a view showing an example of a database search system according to the present embodiment. Numerals 101 to 104 designate various databases that are searched. Numeral 105 designates a display unit for displaying search results and the records in a database. Numeral 106 designates a mouse unit for indicating a point on the screen of the display unit 105. Numeral 107 designates a transmit/receive and calculating unit for transmitting a search request to the databases 101 to 104 and receiving the results therefrom. The results of the transmit and receive processes are displayed on the display unit 105 through the instruction of the transmit/receive and calculating unit 107.

FIG. 2 a view showing an example of the structure of a table stored in each of the databases 101 to 104. A column 201 is a field for storing search keys for the database in which the table is stored. A column 202 is a field for storing individual records (contents) stored in the database. A field 203 is a field for storing search keys for records in another database that are related to the records stored in the same line.

Figure 3:
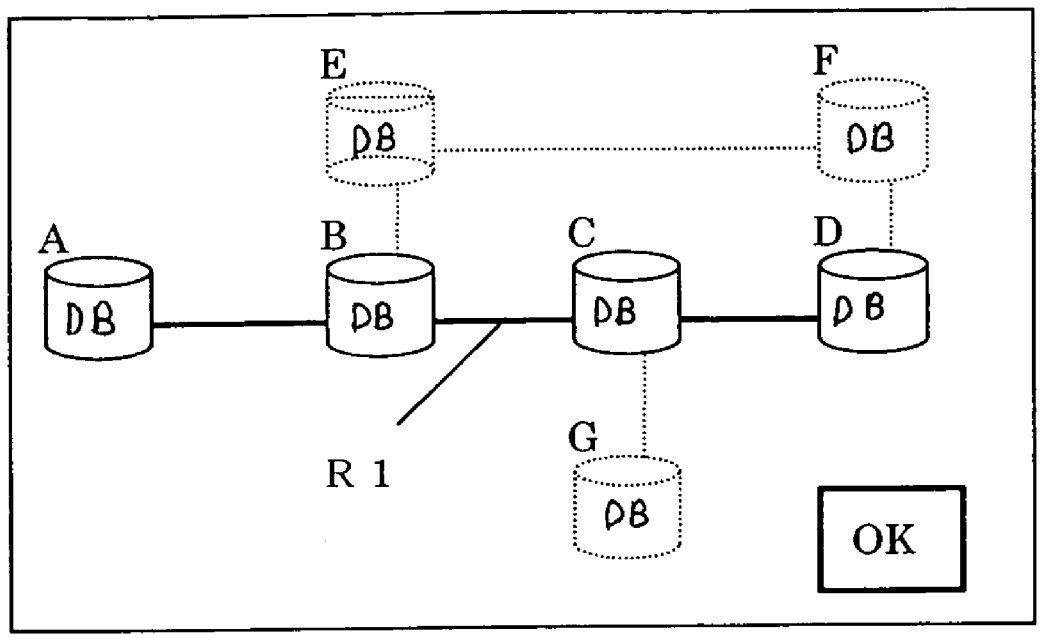
FIG. 3 is a view showing an example of the configuration of the database and a search path.

FIG. 3 is a view showing the relationship among databases displayed, for example, on the screen of the display unit 105. As shown in FIG. 3, it is assumed, for example, that a search is carried out in a chain-reactive manner along the path indicated by a solid line R1 among a plurality of databases from A to G. In this case, the database A is designated as a key database and the database D as a terminal database, thus assuming that the chain-reactive search is performed in the order of A→B→C→D.

FIG. 4 is a view showing an example of a screen displaying a search result. A line 301 is a field for displaying the name of a database or a database identifier, and the databases A to D of FIG. 3 are displayed. Numeral 302 (the entirety except for the line 301) represents a field for displaying individual search keys obtained as search results. FIG. 5 is a view showing an example of a screen which displays a single record. Numeral 401 represents a field for displaying a search key corresponding to the displayed record. Numeral 402 represents a field for displaying the record itself.

Figure 6:
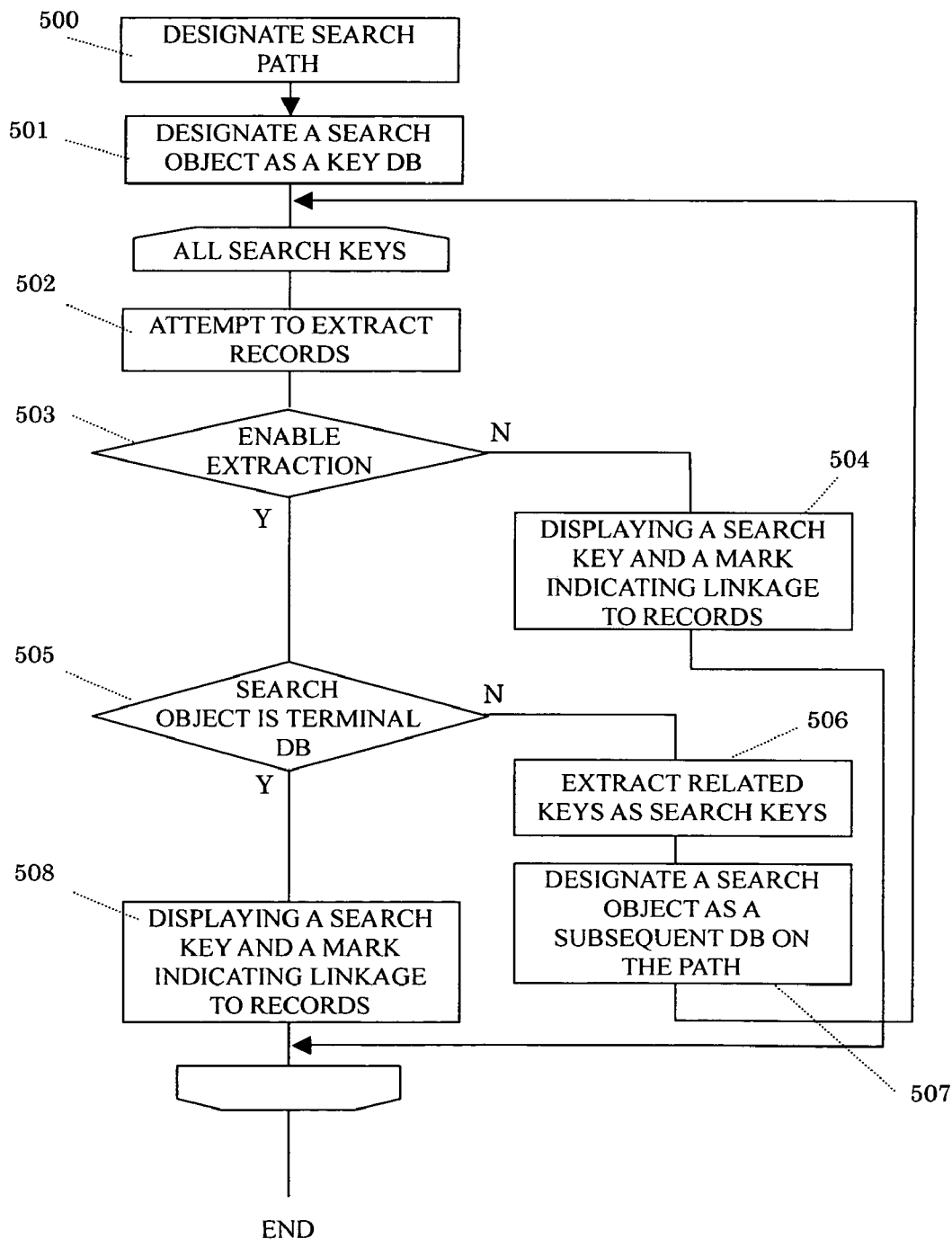
FIG. 6 is a flowchart illustrating the flow of search processes in the database search system according to the embodiment of the invention.

FIG. 6 is a flowchart illustrating the flow of processes of the database search system according to the present embodiment. Hereafter, based on the flowchart of FIG. 6, database search processes of the present embodiment will be described in detail. In the present embodiment, it is supposed that, prior to the initiation of search, a search path is designated in step 500, that is, a search key is entered into the database, and a path to be used for performing chain-reactive retrieving of records and a database to be regarded as a terminal database to terminate the search are designated. In brief, the database A is designated as the key database, the database D as the terminal database, and the databases B and C as intervening databases, as shown in FIG. 3. This case is used as an example for description.

In step 501, the database A (FIG. 3) is designated as the key database being searched. The following steps are performed in the database A that is an object being searched, using all the search keys. When the key database to be searched is designated, one search key is typically used as shown in FIG. 4. However, there may be other cases wherein a plurality of search keys are entered into each key database. In these cases, the following steps may be performed for each of the search keys to be entered.

Next, in step 502, a single search key is entered into the database to be searched, and the system attempts to retrieve records specified thereby by referring to the table of FIG. 2. Then, when the record retrieving fails, the failure is detected in step 503 and the routine advances to step 504. When the record retrieval is successfully performed, the routine advances to step 505.

When the record retrieval failure is determined in step 503, a search key and records in the database that has been searched just before in the filed 203 are acquired from the fields 201 and 202 in step 504. The search key is corresponding to a record to be retrieved at this point, Next, the search key is displayed in a column of the searched database in the field 301 on the screen of FIG. 4. At this time, underlines are displayed for character strings of the search keys, indicating linkage to record display screens. In FIG. 4, for example, the search key "B0001" is a search key of database B, and it indicates that the subsequently searched database C stores no records in terms of related keys (stored in the field 203 of FIG. 2) retrieved using this search key. Next, the routine advances to a process wherein a next search key is entered into the database that is currently a search object.

When it is determined in step 503 that the record retrieval has been successfully performed and in step 505 that the searched database is not a terminal database (DB) D, the routine advances to step 506. However, when it is determined that the searched database is the terminal database (D), the routine advances to step 508. In step 506, related keys stored in the field 203 are retrieved in accordance with the retrieved records and these keys are used as search keys. Next, in step 507, a subsequent database on the path is designated as being searched and the processing from step 502 is repeated using the above search keys.

When it is determined in step 505 that the searched database is the terminal database D, the search keys entered into the terminal database D and underlines indicating linkage to records corresponding to the search keys are displayed in the rightmost line (database D) of FIG. 4. Then, the processing from steps 502 to 508 is repeated using a next search key and designating the key database as being searched.

Consequently, when the record retrieval is completed by using all the search keys, the configuration shown in FIG. 4 may be displayed on the screen. FIG. 4 shows that five records, "D0002," "D0003," "D0006," "D0007," and "D0008" terminal database D, are retrieved using a search key "A0001." Further, related records are not stored in the intervening database C in terms of "B0001," and related records are not stored in the terminal database D in terms of "C0003" and C0004."

Based on the data configuration of FIG. 4, a user can visually confirm that related records should have been basically stored in the database C or D, though the related records are not stored due to record selection standards or the like possessed by provider of the database C or D.

In other words, it is possible to anticipate and read the features of a theme that the user has selected based on the display. For example, such features may be whether or not there is any evidence that indicating that any search or discovery regarding related records has been carried out, or that although the search/discovery has been carried out, the results thereof contain problems so the related records are not stored in the database.

In addition, the screen of FIG. 5 is displayed automatically or by designated operations such as clicking an underline of a record in the field 302 at the point with a mouse unit 106 where the chain of related records comes to a halt. Direct reference to the records allows a user to confirm the features in detail. In other words, an ID, an excerpt of a record corresponding to the ID and the like can be displayed as shown in FIG. 4. Thus, the contents of the database or the matters relating to the contents of a search key at the point where the halt takes place can be easily obtained.

As described above, in the method for displaying the results of a database search according to the present embodiment, a record retrieval is carried out using a first search key that is entered into a key database, and a key that is contained in the retrieved record and different from the first search key is entered as a second search key into a second database different from the key database. Then, a record retrieval is carried out in the second database, which is followed by the retrieval of search keys and records from at least two databases in a chain-reactive manner. Upon retrieval of records from a pre-designated terminal database, the database system provides the retrieved records as search results. In such database system, the following findings (information) can be obtained.

(1) The user can recognize that sufficient number of records cannot be retrieved from the terminal database because records of any intervening database do not contain search keys for subsequent databases in the course of retrieving search keys and records using the entered search key along a specified path in a chain-reactive manner up to the terminal database.

(2) If any intervening database has a record that does not contain a search key for the subsequent database, the user can easily and visually recognize the record.

(3) If any intervening database has a record that does not contain a search key for the subsequent database, the user can assume the reason why the search key is not contained by directly referring to the record.

The processes described with reference to FIG. 6 may be rendered into a program to be carried out by a computer, such program being encompassed by the scope of the invention.

EFFECT OF THE INVENTION

According to the present invention, retrieval of search keys and records is performed in a plurality of databases in a chain-reactive manner, record retrieval is performed in a pre-designated terminal database, and thereby it is possible to obtain information concerning records that cannot be retrieved on a specified search path in the course of retrieving search keys and records in a chain-reactive manner up to the terminal database using the entered search key in accordance with the search path. Also, the reason why the search keys are not contained can be anticipated.

What is claimed is:

1. A computer implemented method of outputting a database search information in a database system for retrieving records using a search key and retrieving records from a plurality of databases in a chain-reactive manner, the method comprising:

a step of retrieving a record by entering an initial search key into an initial database;

a step of retrieving a subsequent record by entering a subsequent search key, which is contained in the retrieved record and different from the initial search key, into a subsequent database different from the initial database in a chain-reactive manner from the initial database via a plurality of sequent databases to provide subsequently retrieved records as search results; and a step of outputting, in the case that a first subsequent record retrieved from a first subsequent database on a chain-reactive search path does not contain a subsequent search key to be entered into a second subsequent database that is subsequently searched, information for identifying a first subsequent record that does not contain the subsequent search key and information for identifying the first subsequent database having the first subsequent record, wherein in the step of retrieving subsequent records in a chain-reactive manner, information for identifying a group of search keys and a group of records retrieved through a series of retrieval processes in accordance with the search path is displayed in a matrix form using the databases and a group of the first search keys as indexes.

2. The computer implemented method of outputting a database search information according to claim 1, in the case that the first subsequent record that does not contain a subsequent search key to be entered into a second subsequent database is present among records retrieved from any intervening database other than the initial database and a pre-designated terminal database, the method further comprising:

a step of outputting the contents of the first subsequent record at the same time with said step of outputting information or in accordance with a specific operation, wherein in the step of retrieving subsequent records in a chain-reactive manner, information for identifying a group of search keys and a group of records retrieved through a series of extraction processes in accordance with the search path is displayed in a matrix form using the databases and a group of the first search keys as indexes.

3. A program stored in a computer readable medium for causing a computer to carry out a method of outputting a database search information in a database system for retrieving records using a search key and retrieving records from a plurality of databases in a chain-reactive manner, comprising:

a module for retrieving a record by entering an initial search key into an initial database;

a module for retrieving a subsequent record by entering a subsequent search key, which is contained in the retrieved record and different from the initial search key, into a subsequent database different from the initial database in a chain-reactive manner from the initial database via a plurality of sequent databases to provide subsequently retrieved records as search results; and a module for outputting, in the case that a first subsequent record retrieved from a first subsequent database on a chain-reactive search path does not contain a subsequent search key to be entered into a second subsequent database that is subsequently searched, information for identifying a first subsequent record that does not contain the subsequent search key and information for identifying the first subsequent database having the first subsequent record, wherein in the module for retrieving subsequent records in a chain reactive manner, information for identifying a group of search keys and a group of records retrieved through a series of retrieval processes in accordance with the search path is displayed in a matrix form using the databases and a group of the first search keys as indexes.

4. The program according to claim 3, in the case that the first subsequent record that does not contain a subsequent search key to be entered into a second subsequent database is present among records retrieved from any intervening database other than the initial database and a pre-designated terminal database, the program further comprising:

a module for outputting the contents of the first subsequent record at the same time with said module for outputting information or in accordance with a specific operation, wherein in the module for retrieving subsequent records in a chain-reactive manner, information for identifying a group of search keys and a group of records retrieved through a series of retrieval processes in accordance with the search path is displayed in a matrix form using the databases and a group of the first search keys as indexes.

* * * * *